April 25, 1950 I. A. PAIGE 2,505,200
COMBINATION HEATER AND COOKING STOVE
Filed Jan. 16, 1946 2 Sheets-Sheet 1
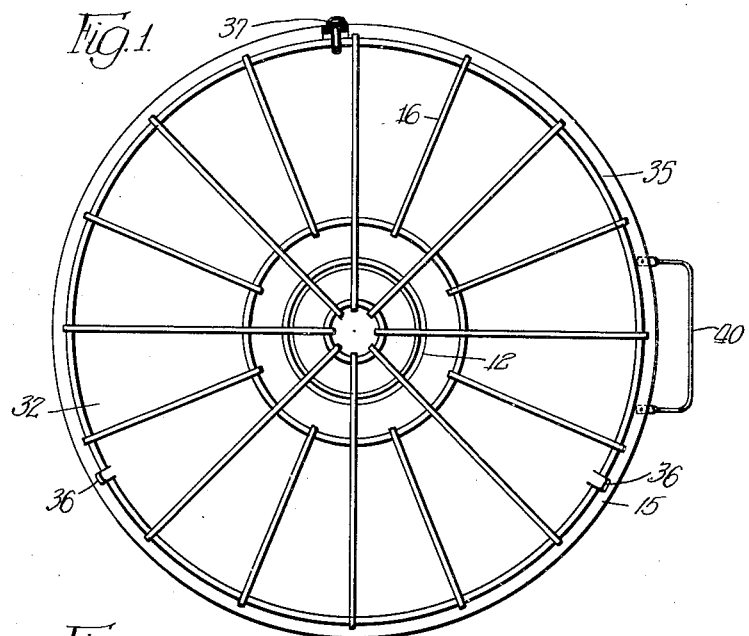
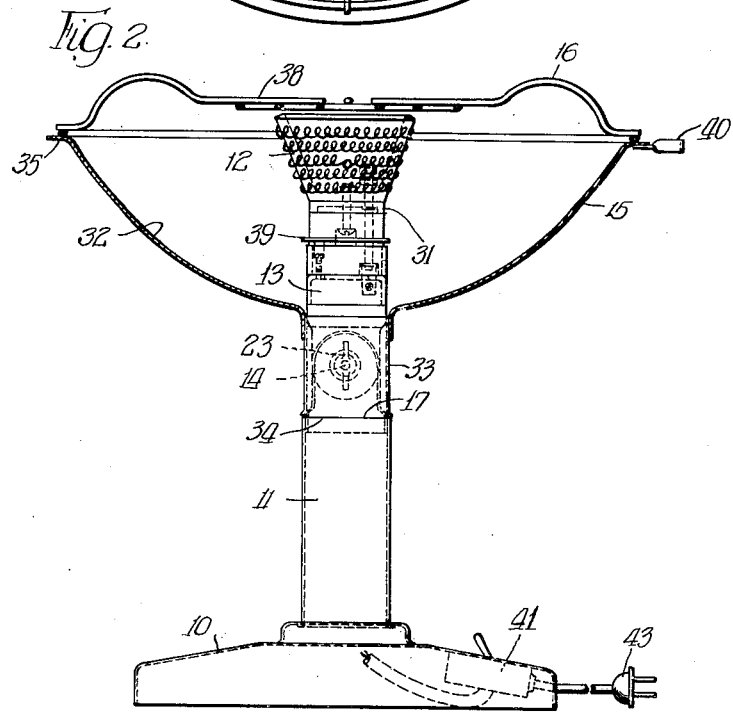
INVENTOR.
Isaac A. Paige,
BY
Cromwell, Greist & Worden
attys.

April 25, 1950     I. A. PAIGE     2,505,200
COMBINATION HEATER AND COOKING STOVE
Filed Jan. 16, 1946     2 Sheets-Sheet 2
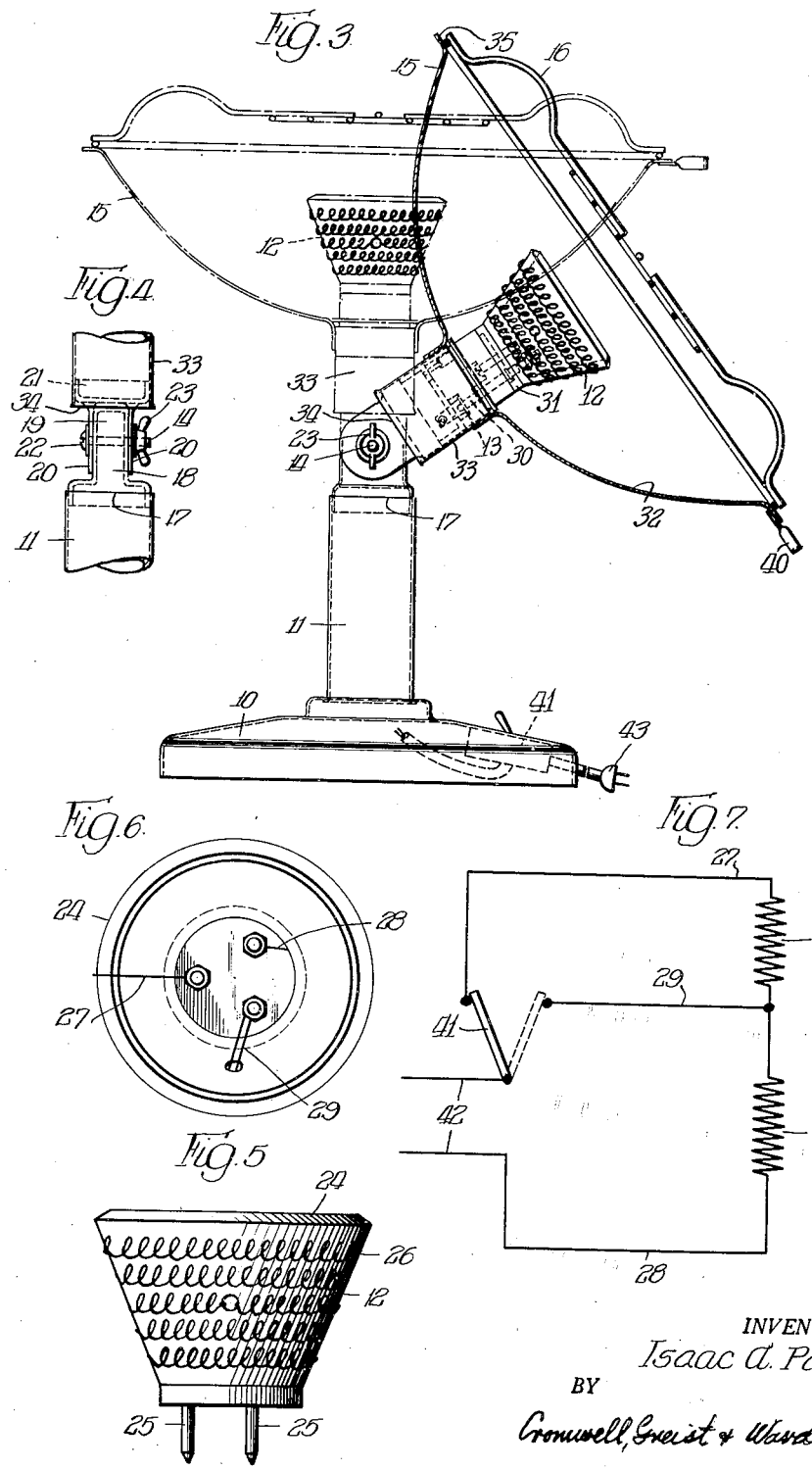
INVENTOR.
Isaac A. Paige, Patented Apr. 25, 1950

2,505,200

UNITED STATES PATENT OFFICE 2,505,200

COMBINATION HEATER AND COOKING STOVE

Isaac A. Paige, Chicago, Ill.

Application January 16, 1946, Serial No. 641,472

6 Claims. (Cl. 219—34)

My invention is concerned with a combination electrical heater and cooking stove.

It is an object of my invention to provide an electrical device comprising an electrical heater unit so constructed that it may be readily converted into an electrical cooking stove.

More specifically, it is an object of my invention to provide an electrical device comprising a base or supporting element, an electrical heating element pivotally supported thereon and a bowl-type reflector provided with a grill which may be moved relative to the heating element whereby the device may be converted from a tilted bowl-type heater to an upright cooking stove, or vice versa.

These and other objects will be apparent from a description of the preferred form of my invention which is shown, by way of illustration, in the accompanying drawings, wherein:

Fig. 1 is a plan of my device in position for use as a cooking stove;

Fig. 2 is an elevation of my device as shown in Fig. 1, with certain parts thereof in section;

Fig. 3 is a view similar to Fig. 2 showing the device arranged for use as a heater and illustrating the manner in which my device may be arranged for use as a cooking stove;

Fig. 4 is an elevation of a portion of Fig. 3 showing the pivotal connection between the heating element support and the base;

Fig. 5 is an elevation of the heating element;

Fig. 6 is a plan of the heating element; and

Fig. 7 is a wiring diagram of the electrical circuit.

The preferred form of my device, as illustrated in the drawings, comprises a supporting standard or base member 10 having an upright supporting element or post 11, a heating element 12 removably positioned in a base or connecting member 13 which is pivotally mounted at 14 on the post 11 and a bowl-type heat reflector element 15 provided with a protective cage or grill member 16.

The standard 10 provides a support for the whole device and includes the upright tubular post 11 having a top edge 17. A bracket 18 projects from the top of the post 11 and is provided with a reduced portion 19 forming one of the pivotal connecting members at the pivot point 14. The reduced portion 19 of the bracket 18 is received between the legs 20 of a bracket 21 which forms the other pivotal connecting member. A pivot pin 22 provided with an adjusting thumb nut 23 connects the members in detachable pivotal relation. The bracket 21 extends upwardly and carries the base or socket member 13 for the heating element 12.

The heating element 12, as illustrated in Figs. 5 and 6, includes the cone-shaped porcelain member 24 and three downwardly directed contact posts or pins 25 secured in the base thereof. Electrical resistance wire 26 is wound around the outside surface of the cone-shaped porcelain element 24. The top and bottom ends 27 and 28 of the resistance wire 26 are connected to two of the contact posts 25. An intermediate connection 29 is made between the resistance wire 26 and the third one of the contact posts 25. Sockets 30 are provided in the base 13 to receive the contact posts 25 whereby the heating element 12 may be readily removed from the device for replacement or repair. An insulator 31 is provided between the heating element 12 and the base 13.

A bowl-type heat reflector member 15, having the inner surface 32 provided with chrome plating, or the like, is arranged on the member 13 by means of a tubular sleeve 33 which movably telescopes over the member 13 whereby it may be positioned over the pivot point 14 with the lower edge 34 thereof in engagement with the upper edge 17 of the supporting post 11 as shown in Fig. 2. In this position the tubular sleeve 33 retains the heating element 12 and its supporting member 13 in upright position. The reflector 15 is provided with a cage or grill-like cover 16 which is removably secured to the outer flange 35 of the reflector 15 by means of clips 36 and latch means 37 (Fig. 1). The grill 16 is provided with a centrally depressed portion 38 which is reinforced to provide, when in the position shown in Fig. 2, a supporting surface for a cooking utensil. The grill 16 is arranged on the reflector 15, so that, when the reflector 15 is in the outward position (Fig. 3) and the device is being used as a heater, the grill 16 is spaced a substantial distance from the heating element 12. When the device is being used as a cooking stove and the reflector 15 is in the inner position (Fig. 2) the grill 16 is relatively close to the heating element 12, so that the cooking utensil thereon is close to the heating element 12. A stop plate 39 is provided on the member 13 to limit the outward movement of the reflector 15. The reflector 15 is provided with a handle 40.

A switch 41 is provided in the base 10 of my device and electrical connection is provided with a current supply line 42 by means of the conventional connecting member 43. When member 43 is connected to the current supply line 42 one end 28 of the resistance wire 26 is directly connected to the supply line 42, the other end 27 is connected to one terminal of the switch 41, the intermediate connection 29 is connected to another terminal of switch 41 and a third terminal of switch 41 is connected to the supply line 42. By means of this arrangement all of the resistance wire 26 may be supplied with current or only half of it, depending on the position of the arm of switch 41. When the arm of switch 41 is positioned to supply current to all the resistance wire 26 the current required is preferably 1330 watts. Movement of the switch arm to its other position reduces the required current to 660 watts. Of course the resistance wire selected may require more or less current as desired and other switching arrangements may be provided to vary the amount of wire which is supplied with current and thus control the heat produced by the heating element. Any other conventional arrangement may be provided to control the heat produced so that some variation in cooking and heating temperatures may be provided.

While I have specifically described certain details of construction and materials utilized in the preferred form of my device, it will be understood that other details of construction and materials may be resorted to within the scope of my invention.

I claim:

1. A combination electric stove and heater comprising a base member having an upright supporting member, a removable heating unit, a socket support for said heating unit, pivotal means connecting said support to said upright member, and a bowl-like reflector member having a sleeve portion surrounding said support and having a removable grill on the outer end thereof, said reflector member being movable on said support to position said grill relatively close to said heating unit and to position said sleeve over said pivotal means and thereby retain said heating unit and said reflector member in an upright position.

2. In an electric heater unit comprising a base, an upright support, a heating unit, means pivotally mounting said unit on said base, and a bowl-type reflector, means for converting said heating unit into a cooking unit comprising a sleeve member on said reflector in telescoping relation with said pivotal mounting means and movable to a position whereby said heating unit is retained in vertical position.

3. In a structure as recited in claim 5, a grill removably secured on said reflector and movable with said reflector from a position spaced a substantial distance from said heating unit to a position relatively close to said heating unit.

4. An electric heater unit comprising a base support, an electric heating unit, means supporting said heating unit on said base support for movement from a vertical position to a tilted position, and a bowl-like reflector having a sleeve portion on one end positioned around said supporting means and a grill on the other end, said reflector being movable relative to the heating unit when said heating unit is in vertical position to move said grill into a position adjacent to the heating unit and to move said sleeve portion into contact with said base support to retain said heating unit in said vertical position.

5. A combined heater and cooking stove comprising a base portion, an electrically heated head portion, a pivotal connection between said portions for permitting the head portion to be tilted from an inclined heating position to a horizontal cooking position, a protective grill member on said head portion, a support for said grill movably connected to said head portion, and an axially extending portion on said support movable into telescoping engagement with said base portion and extending over said pivotal connection for rendering said pivotal connection inoperative when the head portion is moved into a horizontal position.

6. An electric heating unit, means including a pivotal connection for supporting said unit in either a vertical position or a tilted position, a heat reflecting member having a protective grill removably secured to the outer end thereof, and means movably mounting said reflecting member on said heating unit, said mounting means including relatively slidable interengaging portions adapted to extend over said pivotal connection and rigidly connect the reflecting member and the heating unit whereby when said heating unit is in vertical position and said reflecting member is moved to position said grill immediately above said heating unit said heating unit will be secured in vertical position by said interengaging portions.

ISAAC A. PAIGE.

REFERENCES CITED

The following references are of record in the file of this patent:

UNITED STATES PATENTS

| Number | Name | Date |
|---|---|---|
| 1,102,392 | Denhard | July 7, 1914 |
| 1,673,296 | McManus | June 12, 1928 |
| 1,743,566 | Packeritz | Jan. 14, 1930 |